US008762237B2

(12) United States Patent
Monasterio et al.

(10) Patent No.: US 8,762,237 B2
(45) Date of Patent: Jun. 24, 2014

(54) ESTABLISHING, MODIFYING, AND CUSTOMIZING ACCOUNT-BASED PRODUCTS

(75) Inventors: Belen Monasterio, Madrid (ES); Shari Gooen Diamond, New Rochelle, NY (US); Julie Furr, Brooklyn, NY (US); Mark Temares, Garden City, NY (US)

(73) Assignee: Citicorp Credit Services, Inc., Long Island City, NY (US)

( * ) Notice: Subject to any disclaimer, the term of this patent is extended or adjusted under 35 U.S.C. 154(b) by 3668 days.

(21) Appl. No.: 10/464,745

(22) Filed: Jun. 19, 2003

(65) Prior Publication Data

US 2004/0143526 A1    Jul. 22, 2004

Related U.S. Application Data

(60) Provisional application No. 60/389,502, filed on Jun. 19, 2002.

(51) Int. Cl.
*G06Q 40/00* (2012.01)

(52) U.S. Cl.
USPC ......................................................... 705/35

(58) Field of Classification Search
USPC ......................................................... 705/35
See application file for complete search history.

(56) References Cited

U.S. PATENT DOCUMENTS

| 5,913,202 | A  | * | 6/1999 | Motoyama ................... 705/36 R |
| 6,044,360 | A  | * | 3/2000 | Picciallo ........................... 705/21 |
| 2003/0046208 | A1 | * | 3/2003 | Lubking et al. .................. 705/36 |

OTHER PUBLICATIONS

Consumer Literacy & Credit Worthiness, Marsha J. Courchane, Jun. 1, 2005, Prepared for: Wisconsin Department of Financial Institutions Task Force on Financial Literacy.*
Designing Win-Win Financial Loan Products for Consumers and Businesses, R. L. Keeney, The Journal of the Operational Research Society, vol. 56, No. 9 (Sep. 2005), pp. 1030-1040.*
Do Firms' Product Lines Include Too Many Varieties?, Paul Klemperer, The RAND Journal of Economics, vol. 28, No. 3 (Autumn, 1997), pp. 472-488.*

* cited by examiner

*Primary Examiner* — Alexander Kalinowski
*Assistant Examiner* — Chuks Onyezia
(74) *Attorney, Agent, or Firm* — Eric Sophir; Dentons US LLP

(57) ABSTRACT

Providing an account-based product. A communications portal is provided and consumer data is received via the portal. At least one derived characteristic, e.g., qualification, is determined contemporaneously from the consumer data. A product set is presented, via the portal, including at least one product determined at least in part by the derived characteristic. A selection from the product set is received via the portal, and at least one product feature, e.g., balance transfer, of at least one selected product is activated contemporaneous with the product selection.

2 Claims, 10 Drawing Sheets

FIG. 8

ESTABLISHING, MODIFYING, AND CUSTOMIZING ACCOUNT-BASED PRODUCTS

This application claims priority to a co-pending provisional patent application entitled "METHOD AND SYSTEM FOR PROVIDING PERSONALIZED AND CUSTOMIZABLE ACCOUNT-BASED FINANCIAL SERVICES" having U.S. Ser. No. 60/389,502 filed Jun. 19, 2002; the disclosure of which is hereby incorporated herein by reference.

BACKGROUND

The present invention relates to methods and systems associated with establishing, modifying, and customizing account-based products and services on-line. Preferred embodiments relate to establishing, modifying, and customizing account-based financial products via the Internet.

Existing approaches for establishing, modifying, and customizing account based products and services (collectively referred to herein as "products") typically involve a consumer providing data in person, via postal mail, over the phone, or over the Internet. As implemented, these approaches suffer from several drawbacks. For example, while data may be collected via a convenient communications portal, qualification, e.g., credit decisioning, is typically done off line and a decision is not received by the consumer contemporaneously with data entry. If the decisioning is positive, delays are still likely in activating the account, e.g., receiving the card through the mail, activating the card, or transferring a balance from one or more other cards. Further, consumers are typically limited to choosing from among fixed products with limited (if any) choice of features, benefits, and personalization. Additionally, comparable offers from third parties offering account-based products may lure a consumer away without the opportunity to revise the offering made to the consumer.

SUMMARY OF THE INVENTION

Preferred embodiments of the present invention include a method for providing an account-based product. In those embodiments, a communications portal, e.g., an Internet web site, is provided and consumer data is received via the portal. At least one derived characteristic, e.g., qualification, is determined contemporaneously from the consumer data. A product set is presented, via the portal, including at least one product determined at least in part by the derived characteristic. A selection from the product set is received via the portal, and at least one product feature, e.g., balance transfer, of at least one selected product is activated contemporaneous with the product selection.

BRIEF DESCRIPTION OF DRAWINGS

Each drawing is exemplary and illustrative of the characteristics and relationships described thereon in accordance with preferred embodiments of the present invention, and is intended to be non-limiting.

FIG. 8 illustrates a customization window.

DETAILED DESCRIPTION

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for the claims and as a representative basis for teaching one skilled in the art to variously employ the invention. Throughout this disclosure, the entity providing data is referred to as a "consumer." The use of the term "consumer" is intended to be illustrative and include, e.g., both real and corporate persons seeking to establish or modify one or more account-based products.

Figure 1:
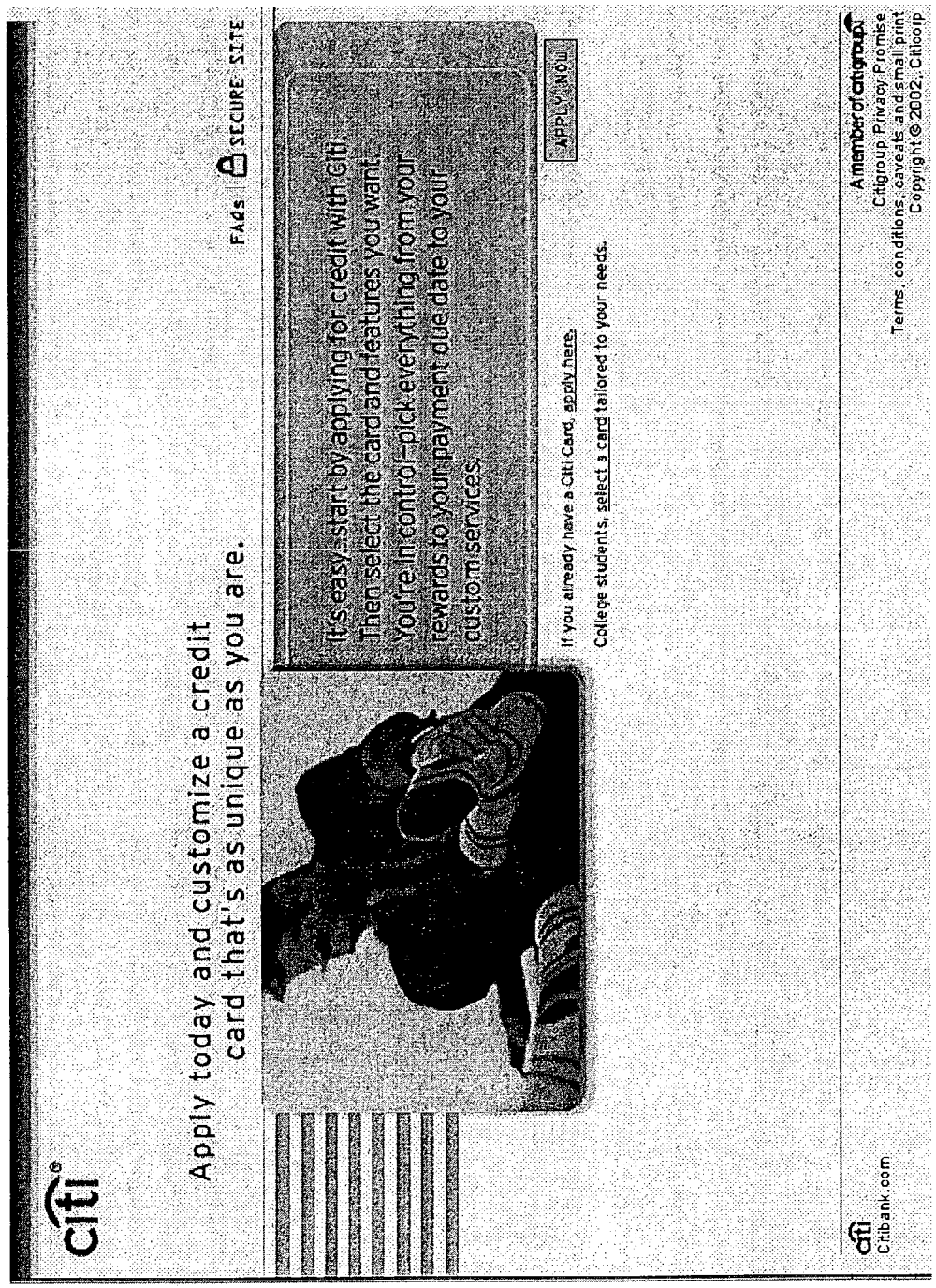
FIG. 1 illustrates a communications portal of the invention implemented as an Internet site.
Figure 2:
FIG. 2 illustrates a sample screen for receiving consumer data.
Figure 3:
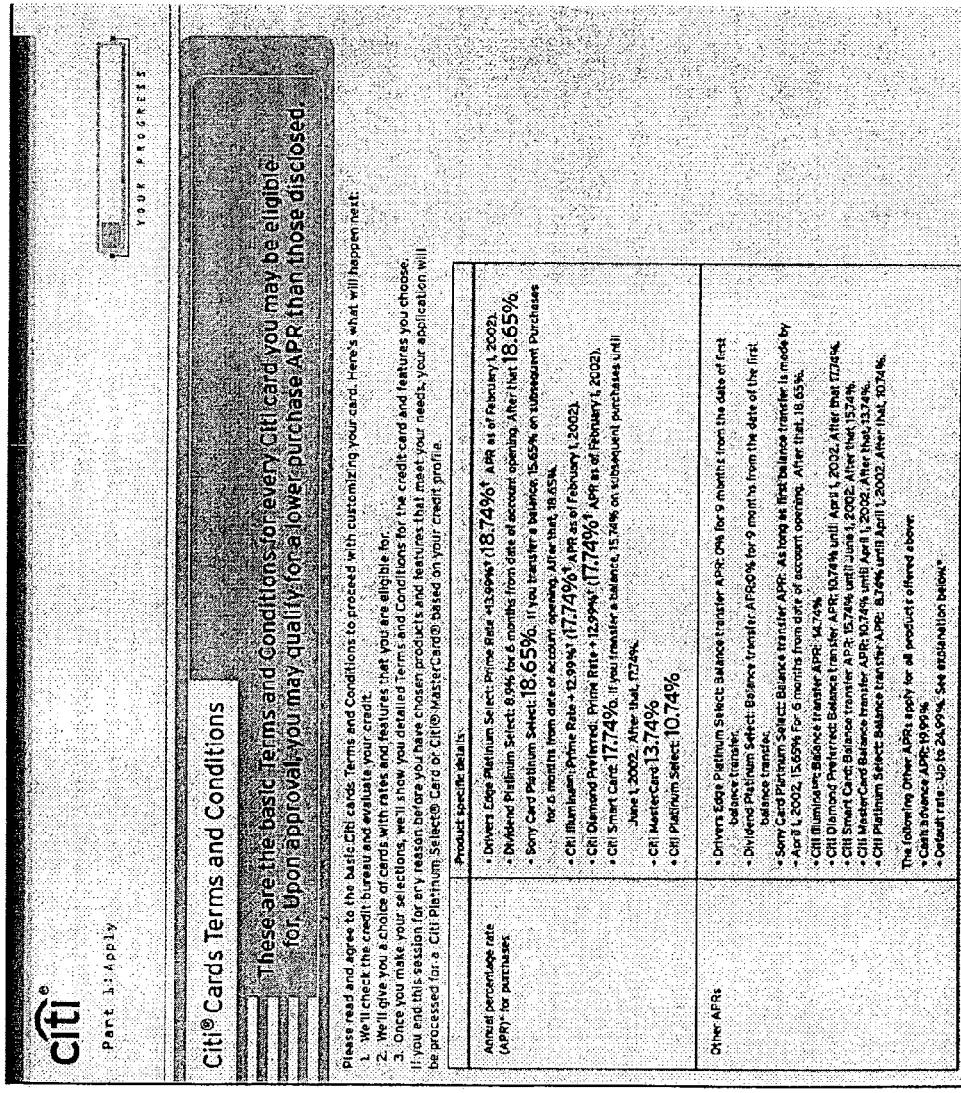
FIG. 3 illustrates terms and conditions related to proceeding with establishing, modifying and customizing an account-based product.

In some embodiments, the invention includes methods for providing an account-based product. Referring to FIG. 1, an Internet site provides a communications portal of the present invention. While other communications portals are contemplated as within the invention, e.g., telephone, interactive kiosk, ATM, interactive television, face-to-face, postal mail, tele-facsimile, the Internet is pervasively available in desirable market segments, enables a highly interactive interface, and can be secured (e.g., via encryption and authentication). Using the portal, a consumer can provide data sufficient for consumer qualification, e.g., creditworthiness, to be determined. FIG. 2 illustrates a sample screen for receiving such information. In preferred embodiments of the invention, the amount of data requested is minimized and repeated requests for the same data are avoided. FIG. 2 illustrates one collection of data sufficient for a determination of creditworthiness. FIG. 3 illustrates terms and conditions that, when agreed to by a consumer, are sufficient to authorize a credit check. While the figures illustrate establishing, modifying, and customizing a credit card, other account based products, e.g., loans, lines of credit, mortgage, cellular telephone accounts, cable television accounts, retail banking accounts, telecommunications accounts, Internet Service Provider (ISP) accounts, brokerage accounts, educational loan consolidation, lend themselves to use of the invention.

Figure 4:
FIG. 4 illustrates a sample screen for receiving consumer data.

After a consumer provides data sufficient to support qualification, e.g., a credit check, and agrees to the terms and conditions, embodiments of the invention determine the consumer's qualification. There are various methods known in the art for determining qualification (a.k.a. "decisioning"), potentially including checks with national credit bureaus and the use of proprietary business rules. In preferred embodiments, determining a consumer's creditworthiness (a typical type of qualification) is done contemporaneous with receiving the data. In addition to determining the creditworthiness of an consumer, embodiments of the invention can also use the entered data to determine, e.g., if the consumer is an existing client, or if a service such as broadband internet access is provided in the consumer's geographical area. The type of data requested at this point can be tailored to support a determination of other derived characteristics that could influence the subsequent presentation or offer other business utility. FIG. 4 illustrates one such set of data. It is noted that the screen of FIG. 4 can be presented to the consumer before the screen of FIG. 3.

Figure 5:
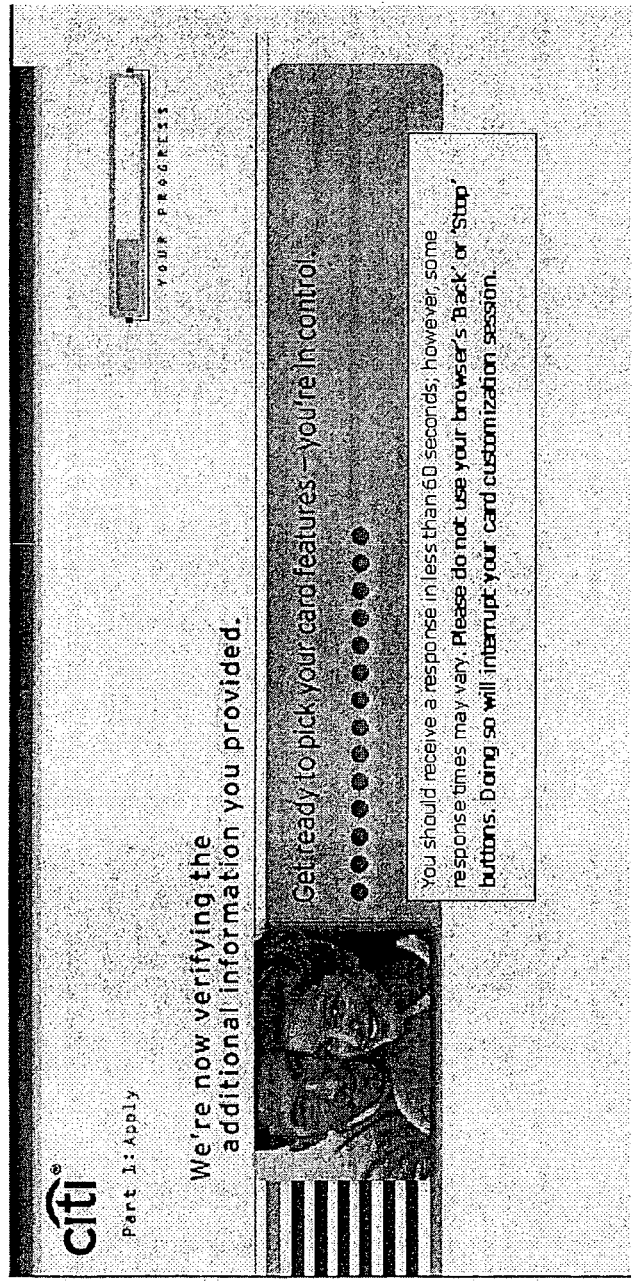
FIG. 5 illustrates a window displayed after a consumer has entered data and while the consumer waits for the results of credit decisioning.

In preferred embodiments, the results of the qualification, e.g., credit check, are presented on-line within a time frame such that the consumer experiences the overall interaction as a single session. FIG. 5 illustrates a window displayed after a consumer has entered data and while the consumer waits for the results of decisioning. Other windows, e.g., windows promoting other products or services, windows providing news, entertainment, or diversion, can be offered. Once a consumer is determined qualified, e.g., creditworthy, for at least one account-based product, selection and customization of the product can proceed. The following paragraphs present a preferred, but not required, sequence for practicing embodiments of the invention. In the drawings and following paragraphs, various aspects of customization are referred to as "features," "benefits," "personalization features," "add-on products," and "affiliated products." These categories are meant to be illustrative only and can be overlapping. Additionally, individual customization aspects can be categorized in more than one manner.

Figure 6:
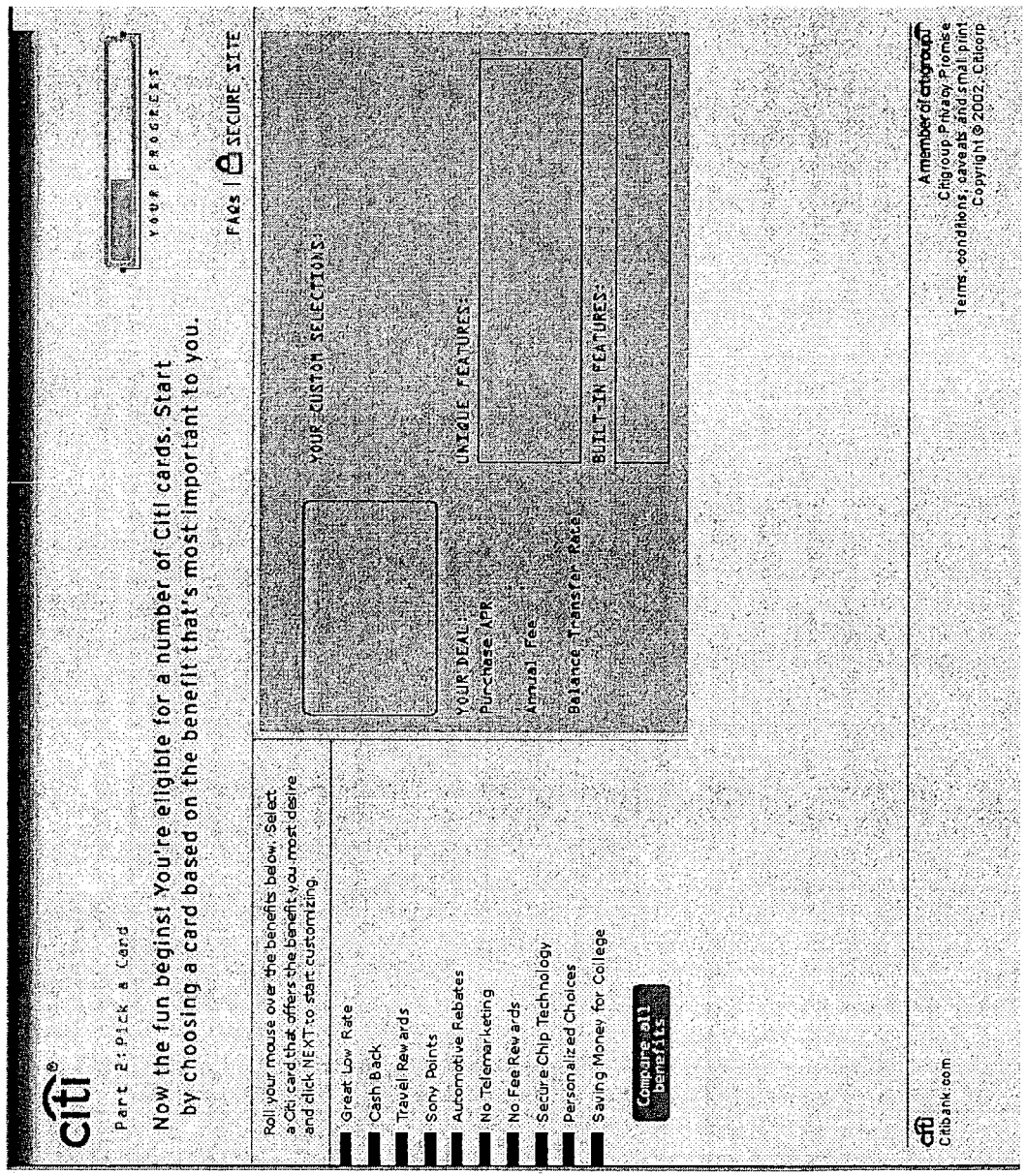
FIG. 6 illustrates a customization window.
Figure 7:
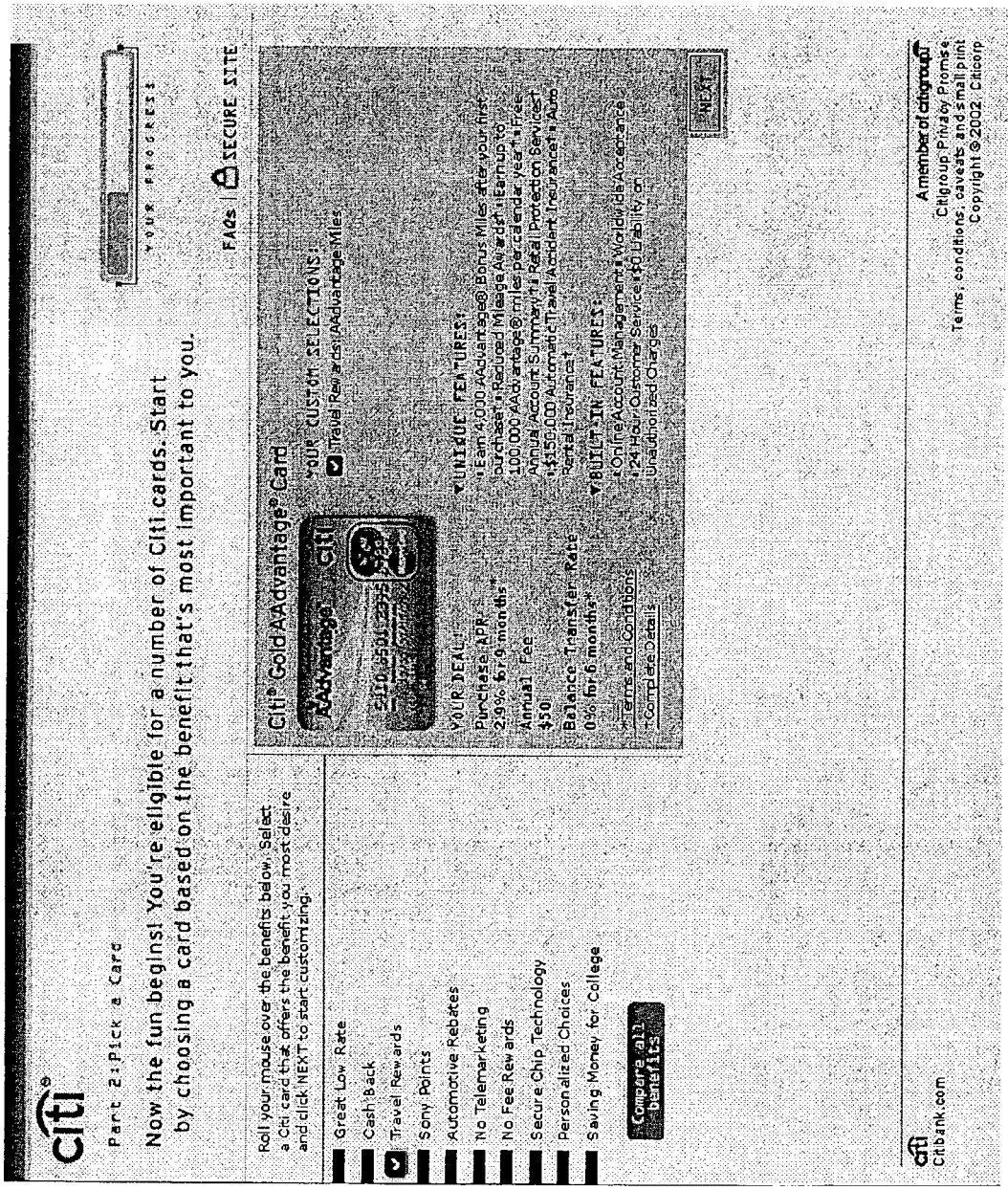
FIG. 7 illustrates a product selection window displayed after a consumer has made an initial customization choice.

Referring to FIG. 6 an exemplary customization window of the present invention is illustrated. In that window, a set of customization choices is presented to the consumer. The set of choices is related to those account-based products for which the consumer has been found eligible. FIG. 6 includes customization aspects that may be characterized as product features (e.g., "Great Low Rate"), benefits (e.g., "Cash Back"), and personalization features (e.g., "Personalized Choices"). Presenting a set of customization choice available across those account-based products for which the consumer has been found eligible (instead of present the products themselves) is a preferred, but not required, sequence of the invention. FIG. 7 illustrates a window where the consumer's selection of "Travel Rewards" is shown to correlate to the "Citi® Gold AAdvantage® Card."

Figure 8:
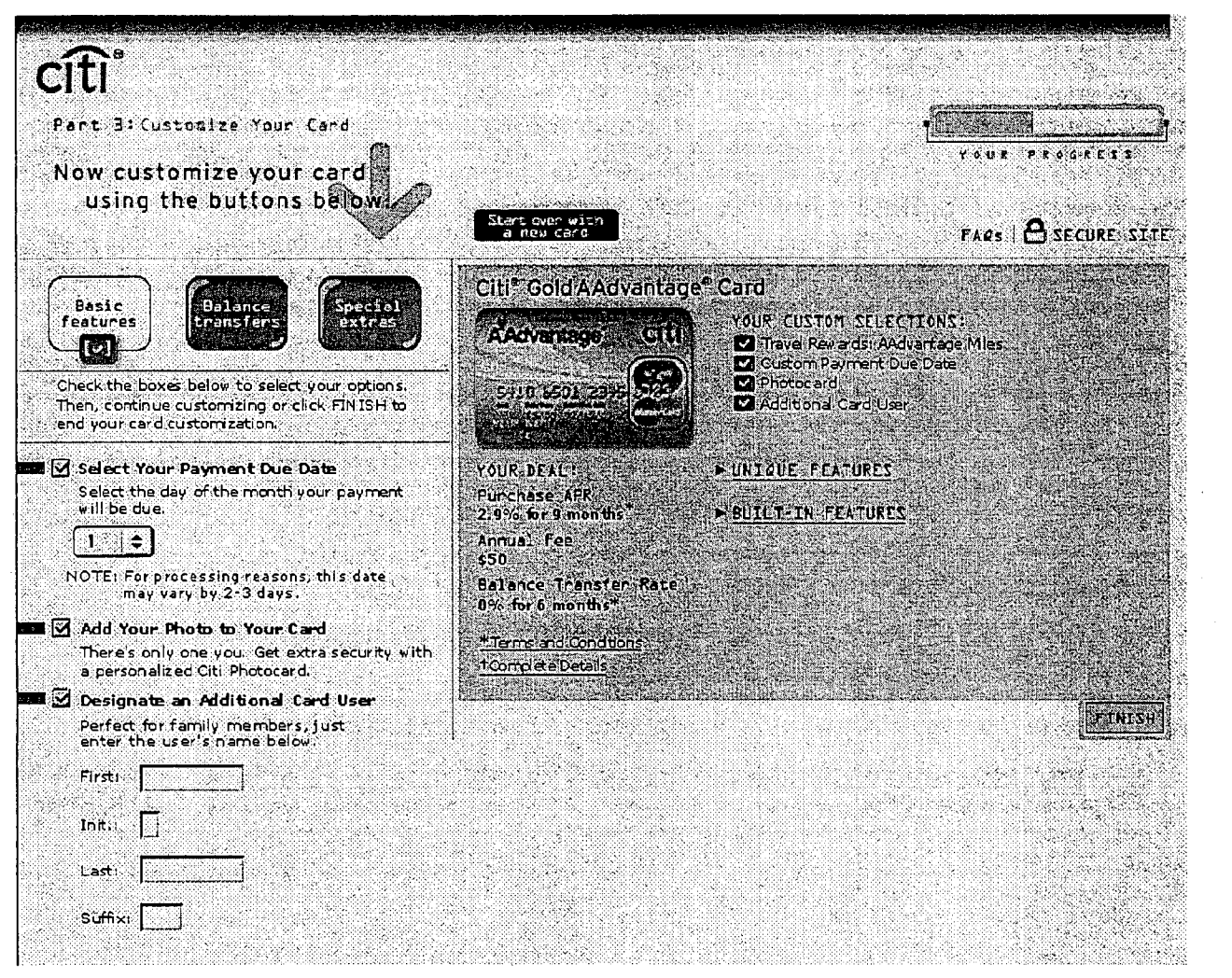

In FIG. 6 and FIG. 7, the approach is to isolate to a product for which the consumer is eligible through selection of customization features not necessarily available on every product for which the consumer is eligible. This particular approach is exemplary only and meant to illustrate a range of approaches to customization. Other sequences for isolating to an individual product and set of features, e.g., personalization, then feature selection, then product selection; then feature selection, then personalization, are within the scope of the invention. FIG. 8 presents the consumer with customization choices associated with the eligible product set. In the figure, a consumer can select a day of the month as the payment due date, can choose to personalize the card with a photo identification, and can designate an additional card user. For other account-based products, other customization features are offered, e.g., selection of automatic payment plans for mortgage products.

In some embodiments the invention includes receiving data on at least one comparative offer made to the consumer by a party other than the party offering the account based product. Preferred embodiments of the invention can respond to such data by presenting a revised product set based at least in part on the comparative offer. For example, in preferred embodiments, a consumer can be offered the opportunity to identify a comparative offer after declining to accept those offers made to him or her through embodiments of the invention. In some embodiments, the consumer is prompted to specify parameters and features of the comparative offer such as rate, rewards, annual fee, and offering entity. This information is subjected to one or more of the following processes: confirmation, reasonableness analysis, and profitability analysis. In preferred embodiments, each process is executed on-line within a time frame such that the consumer experiences the interaction as part of a single session with embodiments of the invention. Confirmation can be accomplished using an on-line library of current known account-based product offerings. Such information is typically gathered by business intelligence and marketing groups. Reasonableness analysis also can be conducted on-line, in some cases using reasonableness calculations and guidelines established by the account-issuing entity. For example, the account-issuing entity may assess that it is currently reasonable for credit card issuers to offer a two-year fixed rate card at the prime interest rate plus one percent; or for a CATV company to offer two premium television channels free for six months. Profitability analysis includes the application of business rules that may trump confirmation and reasonableness rules, e.g., if a highly-valued consumer identified an unconfirmable unreasonable comparative offer, profitability rules may dictate that a revised offer be made to the consumer for the purpose of retaining loyalty. Dynamic business rules can be used to control how confirmation, reasonableness, and profitability are weighed in deciding whether or not to make a counteroffer, and if so, which counteroffer to make.

In some embodiments, the invention includes the ability to present the consumer with a window comparing the features of the set of account-based products for which the consumer has been determined eligible. Preferred embodiments include the ability to compare all offers, compare all offers of a certain type, and order or sort by consumer priority.

Embodiments of the invention also present an opportunity to offer related products and services to a consumer. These may be products and services of an affiliate or a non-affiliated third party. For example, consumers interested in obtaining a credit card over the Internet might also be interested in financial management software, e.g., Microsoft® Money, TurboTax®. In general, data received by the invention (and characteristics derived from that data) can be used to determine whether offers of most any product or service should be made to a consumer during the session.

Figure 9:
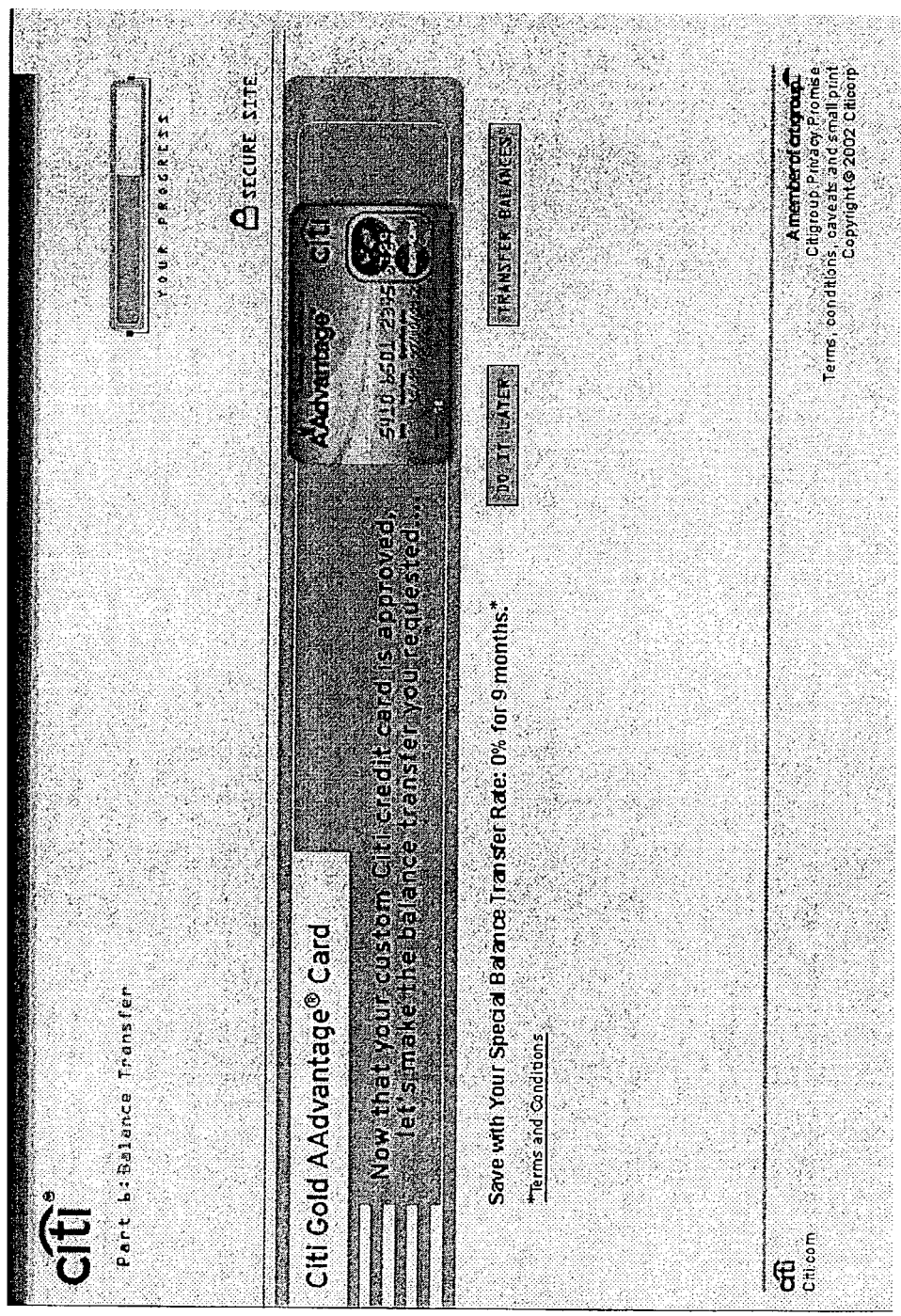
FIG. 9 illustrates a balance transfer activation window.

In preferred embodiments of the invention, after accepting a customized product, the consumer is prompted to activate a product feature. Product feature available for activation include, e.g., for credit card accounts: balance transfer, credit activation for a purchase contemporaneous with product selection; and credit activation for a future purchase. For phone or cable TV features for activation include: upgrading to digital services, adding wireless, and premium channels and packages. FIG. 9 illustrates such an offer for balance transfer. As another example, a consumer could have been linked to a web site of the present invention after indicating a desire to finance the purchase of a personal computer from an on-line retail site. In that case, preferred embodiments of the invention can activate credit for the contemporaneous purchase of the personal computer.

While the embodiment illustrated in the figures (establishing and customizing a single credit card) is exemplary of the invention, preferred embodiments of the invention offer multiple account-based products and/or non-account based products to a consumer based on one or more characteristics derived from the received data. For example, some embodiments of the invention can offer a consumer found to be a new college graduate a set of account based products including a credit card, a new car loan, a student loan consolidation, a home mortgage, and financial management software. As another example, a consumer found to be a new small business could be offered a credit card, a line of credit, (through an affiliate) small business liability insurance, and a credit card processing terminal. Such single qualification across a range of account-based products, along with customization, contemporaneous decisioning, the ability to present a revised product set in the face of comparable offers, and contemporaneous activation, presents a desirable system and method of establishing and customizing an account-based product.

Preferred embodiments of the invention are operable not only with respect to new customers, but also with respect to existing customers. These embodiments offer existing customers the ability to modify, change, add, and delete options from their existing accounts or to open new accounts. For example, an existing customer can add a new authorized user, customize card, apply for an increase in credit limit, add products, convert to another product, change features, and select or modify add-ons or other product. While existing customers do not have to go through initial qualification, there may still be qualification for newly chosen or modified options or add accounts.

Figure 10:
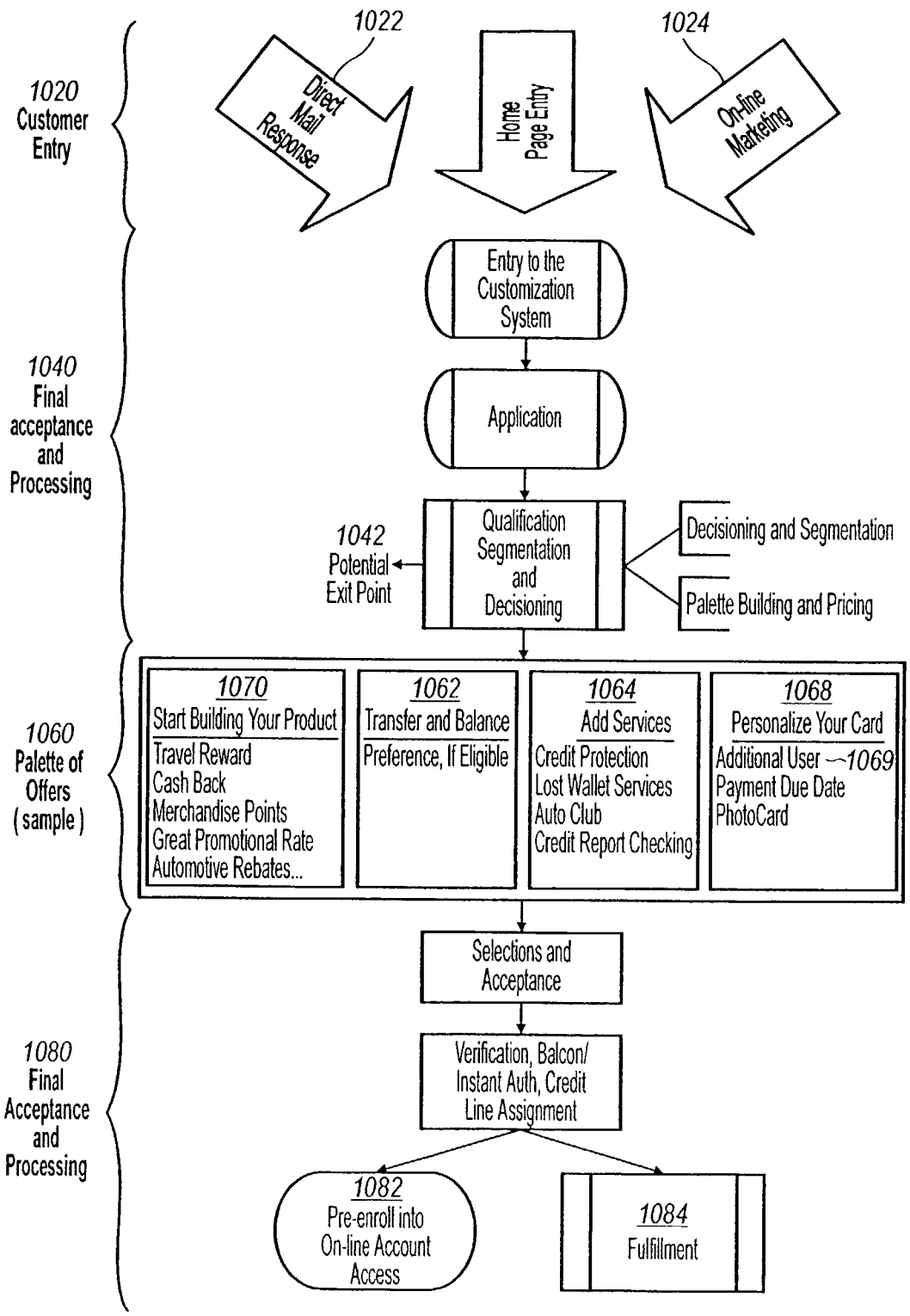
FIG. 10 illustrates a process flow.

Referring to FIG. 10 a preferred method of the present invention, implemented as a web site is shown. In the figure, stages of the method are indicated as: consumer entry 1020, application and decisioning 1040, palette of offers 1060, and final acceptance and processing 1080. A consumer can learn about the web site via various means such as direct mail 1022 and on-line marketing 1024. However the consumer learns about the web site, the consumer can enter through the web site home page. A consumer can then provide application data 1042 sufficient for the account issuer (or someone acting on behalf of the account issuer) to decide which, if any, offers can be made to the consumer. Decisioning can include a pull of records from a credit bureau and classification of the consumer into a market segment. A negative decision is one criterion for the consumer potentially exiting 1042 the process at this point.

Should the decision to offer an account to the consumer be positive, a palette of offers 1060 will be presented. As with other illustrative embodiments, the current embodiment classifies aspects of the options available to a consumer in a non-limiting way, e.g., other approaches to classification of options are equally feasible. The classification of options in FIG. 10 as: "Start Building Your Own Card," "Transfer a Balance," "Add Citi Services," and "Personalize Your Card" are intended as exemplary of a preferred embodiment and not limiting. In the embodiment illustrated in FIG. 10, the palette of offers 1060 includes several options for a consumer to build his or her own card, including choosing travel rewards, cash back, award points for a retail electronics brand, a low rate initial rate on the credit card, and rebates on vehicles. The palette 1060 also includes choices to initiate balance transfer 1062, add optional services 1064, and personalize the card and the account 1068. These choices do not have to be presented in a fixed order. Some choices, e.g., "Additional User" 1069 can be available not only to new customers, but also to existing customers. While other choices, e.g., "Great Promotional Rate" 1070 are typically offered only to new customers. Some options are mutually exclusive while the choice of some options will activate other options for presentation to the customer.

Once the user completes selections from among options, the consumer will indicate a final acceptance of the offer and post-acceptance processing will begin. Post acceptance processing can include verification of application information, verification of consumer choices, authorization of the account for use in a contemporaneous purchase or balance consolidation, balance consolidation itself, enrollment in account management services, and fulfillment 1084.

In some embodiments, those consumers who have not declined, but are not yet qualified, are classified as "pended." One reason to classify a consumer as "pended" is because information necessary to decided on qualification is not available via regular sources in a real time fashion. If consumers in this population are eventually found qualified, they can re-enter preferred embodiments of the invention to complete account-based product establishment and customization.

Embodiments of the present invention have now been generally described in a non-limiting manner. It will be appreciated that these examples are merely illustrative of the present invention, which is defined by the following claims. Many variations and modifications will be apparent to those of ordinary skill in the art.

We claim:

1. A method for providing an account-based product, the method comprising:

providing a communications portal accessible via the Internet;

via the portal, receiving consumer data sufficient to determine consumer creditworthiness;

determining, contemporaneous with receiving the data, at least one derived characteristic of the consumer using the received data, wherein the derived characteristic includes creditworthiness;

via the portal:

presenting an account-based product set wherein the product set includes at least one product determined at least in part by the derived characteristic, and wherein the product set includes at least one of: a credit card, a loan, a line of credit, a mortgage;

receiving data on at least one pre-existing comparative offer from the consumer wherein the pre-existing comparative offer was made to the consumer by a party other than the party offering the account based product;

presenting a revised product set based at least in part on the pre-existing comparative offer;

receiving at least one selection of a product from the product set;

presenting a product feature set, wherein the presented feature set includes at least one feature determined at least in part by the derived characteristic;

receiving at least one selection of a feature from the feature set;

presenting a product benefit set, wherein the presented benefit set includes at least one benefit determined at least in part by the derived characteristic;

receiving at least one selection of a benefit from the benefit set;

presenting a add-on product set, wherein the presented add-on product set includes at least one add-on product determined at least in part by the derived characteristic;

receiving at least one selection of an add-on product activating at least one product feature of at least one selected product contemporaneous with the product selection, wherein the activated product feature includes at least one of: balance transfer, credit activation for a purchase contemporaneous with product selection; credit activation for a future purchase, and wherein activation is via the Internet.

2. The method of claim 1, further comprising the step of processing the data on at least one pre-existing comparative offer, which comprises the step of confirming the data, conducting a reasonableness analysis, or conducting a profitability analysis.

\* \* \* \* \*